Jan. 26, 1965  R. D. WILSDON ETAL  3,167,039
OPERATION OF FURNACES
Filed July 9, 1956

INVENTORS:
RONALD DOUGLAS WILSDON
LAURENCE KING RENDLE
BY
ATTORNEYS

United States Patent Office 3,167,039
Patented Jan. 26, 1965

3,167,039
OPERATION OF FURNACES
Ronald Douglas Wilsdon and Laurence King Rendle, Sunbury-on-Thames, England, assignors to The British Petroleum Company Limited, London, England, a British joint-stock company
Filed July 9, 1956, Ser. No. 596,732
Claims priority, application Great Britain, July 26, 1955, 21,542/55; Mar. 13, 1956, 7,793/56
3 Claims. (Cl. 110—1)

This invention relates to a method of reducing the deterioration of furnaces when using sulphur-containing fuel.

It has been stated that deposits of acidic substances cause a large amount of corrosion in furnaces when using fuel oil containing sulphur and that the deposition of these acidic substances is due to the high dew-point of the flue gases.

It has also been stated that the high dew-point of flue gases is due to the presence of sulphur tri-oxide formed by the catalytic oxidation of sulphur dioxide, and it has been suggested that by coating the interior surfaces of the furnaces with a film of anti-catalytic material, the formation of sulphur trioxide will be inhibited and hence the dew-point of the flue gases lowered.

In the past it has been suggested that, by mixing ammonia with the flue gases in the flame zone, the deposition of ash upon the furnace walls is reduced but we believe that this procedure has no effect on the dew-point of the flue gases.

It has also been suggested that, in order to prevent atmospheric pollution, ammonia may be mixed with flue gases in sufficient amounts to neutralise all sulphur dioxide and sulphur trioxide present before releasing the flue gases into the atmosphere.

It is an object of the present invention to provide a novel method of reducing corrosion in furnaces particularly in steam raising equipment. It is a further object to provide an improved method of operating a furnace for the combustion of sulphur-containing fuels. It is a further object to provide a method of reducing corrosion in furnaces, particularly in steam raising equipment, when using sulphur containing residual fuel oils, derived from petroleum. Other objects will appear hereinafter.

According to the present invention there is provided a method which comprises continuously injecting ammonia into a furnace when using a sulphur-containing carbonaceous or hydrocarbon fuel, the ammonia, in an amount constituting from 0.5% wt. to 9.0% wt. based on the total weight of sulphur in elemental and combined form in fuel fed, being injected into a part of the combustion zone of said furnace beyond the flame zone at which the temperature is above the dew-point of untreated combustion gases and below that at which the ammonia would be oxidised.

By the term "combustion gases" we means gases consisting of or containing the products of combustion of said fuel. The term includes partially combusted gases and the injection means will thus be positioned to discharge ammonia into the gas stream beyond the flame zone, being either in or beyond the zone of low temperature (that is invisible) combustion.

The part of the combustion zone into which the ammonia is injected is preferably below 1000° C., and, more particularly, below 500° C.

The method herein described may be applied when using any sulphur-containing carbonaceous or hydrocarbon fuel, for example, refinery gases, town gas, petroleum distillate or residual fuels, acid tars, coal tars, soft coals, bituminous coals, anthracites and steam coals and cokes. The method of operating furnaces herein described is particularly suitable when using residual fuel oil derived from petroleum.

When using residual fuel oil containing less than 5% by weight of sulphur, the amount of ammonia injected, in unit time, into the furnace is between 0.03% and 0.1%, preferably 0.06% to 0.1%, the percentages being on weight of fuel oil.

According to another aspect of the present invention there is provided an improved method of operating a furnace, for the combustion of a sulphur-containing petroleum residue fuel oil, having injection means, for supplying ammonia gas, said injection means being positioned in such manner, that, in operation, ammonia is discharged into a stream of combustion gases within said furnace at a point at which the temperature of said stream is above the dew-point of untreated combustion gases and below that at which ammonia would be oxidised.

Furthermore, there is provided an improved steam raising boiler, for the combustion of a sulphur containing petroleum residue fuel oil and having a water tube preheating stage, said boiler having injection means, for supplying ammonia gas, positioned in such manner that, in operation, ammonia is discharged into a stream of combustion gases after said combustion gases have passed over the steam raising tubes and prior to their passage through at least part of said preheating stage.

The ammonia may be injected in gaseous form or as an aqueous solution. Preferably the injection means consist of a perforated tube or tubes, for example in the form of a ring main, shaped and positioned so that in operation ammonia is injected over substantially the whole cross-section of the stream of combustion gases.

Other methods of introducing ammonia include:

(1) The discharge of gaseous ammonia through sintered metal discs, preferably of steel, whereby the internal manifold pressure and hence exit velocity are increased, thus reducing the effect of variations in pressure external to the discharge points and improving the efficiency of mixing.

(2) Dilution of gaseous ammonia with flue gas, the blend being introduced through a perforated tube distributor.

(3) The use of ammonia solution introduced by spray or atomising nozzle.

Deposits of ammonium salts can build up on heat exchanger surfaces and the provision of means for removing these deposits without shut-down is very desirable. Preferably furnaces according to the present invention or when used according to the method of the present invention are provided with facilities for on-load or off-load water washing of air heaters and/or economisers.

It is believed that the ammonia neutralises the sulphur trioxide with the formation of ammonium sulphate and/or ammonium bisulphate depending on conditions in the furnace, the sulphur dioxide present not reacting with the ammonia as the product, ammonium sulphite, is unstable at temperatures occurring in the furnace. Thus the amount of ammonia needed will be the stoichiometric quantity for neutralisation of the sulphur trioxide, and this theoretical amount agrees very favourably with experimental results, as will be seen from the tables below.

The invention is illustrated, but by no means limited, by the following example:

EXAMPLE

The apparatus used consisted of a furnace having two main components, a combustion chamber and a "cool" chamber, which are maintained at a high and a low temperature respectively. Each of these two chambers were of similar design except that the combustion chamber was 5 feet 3 inches long and the "cool" chamber was 1 foot 11 inches long. The two chambers were cylindrical in shape and mounted with their axes horizontal. They had external diameters of 2 feet 5 inches and were connected to each other axially by a 2 foot length of 4 inch diameter silica tube. In both components the walls consisted of an outer mild steel shell, a layer of three inch thick insulating brickwork and an inner 4½ inch thick layer of Sillimanite refractory. A dew-point probe was fitted to a duct which communicated with the interior of the "cool" chamber. A Y-type medium air pressure oil burner was fitted axially at the inlet end of the combustion chamber and was mounted on a casing to which secondary air was delivered under pressure by a forced draught fan. Fuel was supplied to the burner from two 20 gallon thermostatically controlled tanks. A gear-type rotary pump was used and the fuel was filtered and preheated to the required temperature before entering the burner. Primary air for combustion was drawn from the laboratory air supply.

The greater part of the flue gases was discharged to atmosphere through the combustion chamber stack, but a small proportion was withdrawn through the cool chamber by an extraction fan. Gas and fuel temperatures were measured at various points by chromel-alumel or iron-constantan thermocouples; the gas sample points were fitted to the combustion and cool chambers for Orsat and sulphur oxide analyses.

The ammonia was admitted into the cool chamber by injecting a metered stream of anhydrous ammonia from a pressurised cylinder.

Using a petroleum residual fuel oil feedstock having the following physical characteristics:

| | |
|---|---|
| Specific gravity | .9345 at 60/60° F. |
| Flash point | 188° F. |
| Sulphur | 3.14% wt. |
| Calorific value | 18,560 B.t.u./lb. |
| Viscosity (Redwood No. 1 at 100° F.) | 441 secs. |
| Pour point | 45° F. |
| Water | Trace. |
| Ash | 0.032%. | and under conditions as shown in Table 1, the results shown in Table 2 were obtained.

*Table 1*

| | |
|---|---|
| Means feed rate | 6.80 lb./hr. |
| Combustion chamber temperature | 1000° C. |
| Cool chamber temperature | 300° C. |
| Excess air | 25% by vol. |
| Sulphuric acid dew-point of flue gases from feedstock only | 139° C. |

*Table 2*

| Ammonia Concn., Percent wt. on Feed | Dew-Point of Flue Gases, ° C. | Reaction on dew-point probe (to Methyl Orange Indicator) |
|---|---|---|
| 3.13 | >50 | Neutral. |
| 2.74 | >44 | Do. |
| 2.15 | >62 | Do. |
| 1.77 | >62 | Do. |
| 0.074 | >54 | Do. |
| 0.056 | >46 | Acidic. |
| 0.042 | >52 | Do. |
| 0.030 | >50 | Do. |
| 0.028 | >49 | Do. |
| 0.021 | >50 | Do. |
| 0.015 | >87 | Do. |
| 0.0094 | ¹(139) | Do. |
| 0.0067 | ¹(139) | Do. |

¹ The dew-point actually measured was about 10° C. higher than indicated owing to spurious effects arising, it is believed, from the presence of ammonium bisulphate. The figure quoted is that of the gases in the absence of ammonia.

Using an air-cooled corrosion probe under the above described conditions with ammonia injection at the rate of 0.086% by weight on feed, the results obtained were as shown in Table 3. Corrosion rate is expressed as milligrams of iron for a 1 inch diameter mild steel hemisphere per hour.

*Table 3*

| Probe temperature | Corrosion Rate | |
|---|---|---|
| | Without ammonia | With ammonia |
| 93 | 6.5 | 0.2 |
| 113 | 5.5 | 0.1 |
| 134 | 2.6 | 0.3 |
| 160 | 1.1 | 0.2 |

Stoichiometric quantity of ammonia for complete neutralisation of $SO_3$ (to ammonium sulphate) is 0.6 g./hr., that is, 0.06% wt. on feed (assuming mean $SO_3$ content of dry flue gases is 0.003% vol.). For formation of ammonium bisulphate, 0.3 g./hr. is required, that is 0.03% wt. on feed.

The apparatus for practicing the method of the present invention is illustrated but in no way limited with reference to the accompanying FIGURES 1–3, wherein.

With reference to said figures.

Figure 1:
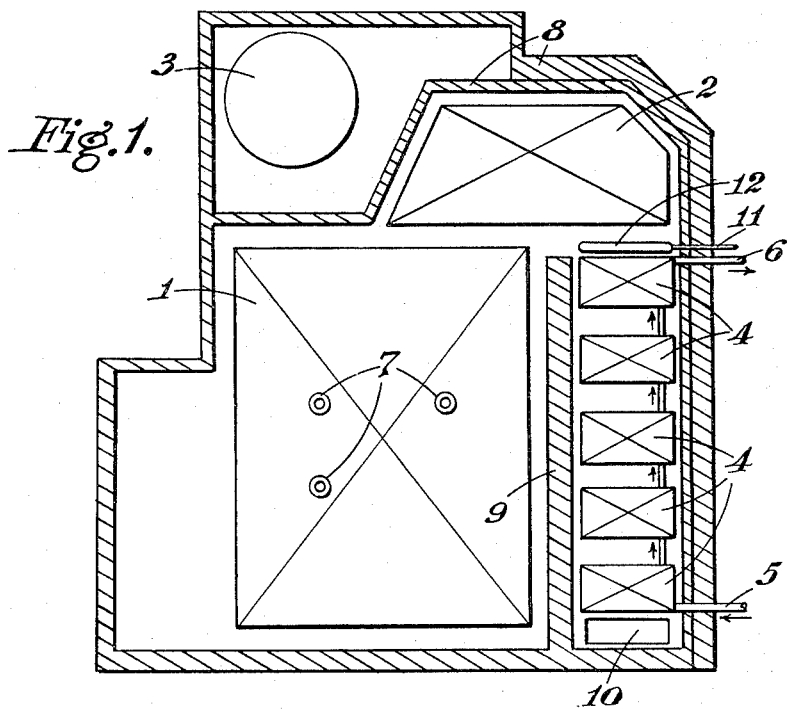
FIGURE 1 is an elevation in section of an oil fired, water tube boiler with forced circulation equipped according to the invention.
Figure 2:
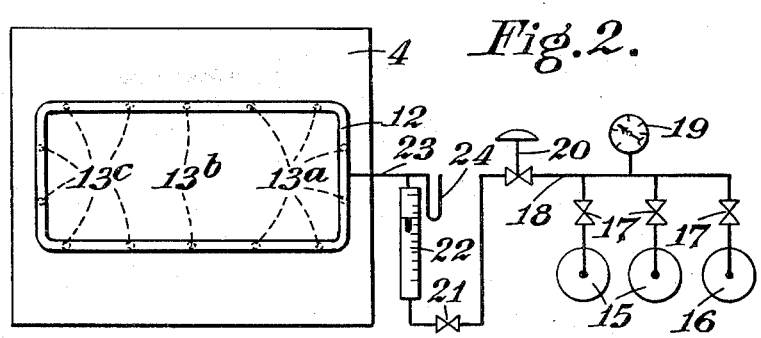
FIGURE 2 is a schematic representation of the gas supply system with a plan of the economizer and ammonia injection system.
Figure 3:
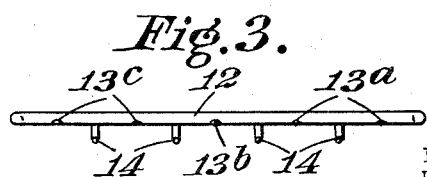
FIGURE 3 is an elevation of the ammonia injection system.

The boiler consists essentially of:

(a) Radiant tubes within zone 1
(b) Superheater tubes within zone 2
(c) steam drum 3
(d) Five banks of horizontal economiser tubes within the zones 4 having water inlet 5 and water outlet 6.

The boiler is provided with three oil burners 7 and is insulated by walls 8. The economiser tubes are separated from the radiant tubes by insulated wall 9 by which flue gases are deflected down over the five economiser banks to flue gas outlet 10.

Ammonia is introduced by pipe 11 to a ring distributor 12 supported on the uppermost bank of economiser tubes by struts 14.

Two ammonia cylinders 15 and a nitrogen cylinder 16 (used to free lines of air before ammonia injection) are connected via valves 17 to main 18 having a pressure gauge 19. From main 18, gas is passed through the pressure reducing vale 20 and needle valve 21 to flow measuring device 22 (suitably a "Rotameter") and thence via line 23, to which is also attached manometer 24, to the ring distributor 12 which has discharge vents 13a, 13b, and 13c.

The size of the discharge vents is varied, as required by the conditions found to prevail in the economiser, to obtain a substantially uniform distribution of ammonia.

By way of illustration, in a boiler having a maximum rated capacity of 11 tons/hour of steam; maximum steam pressure and temperature of 30 kgs./sq. cm. and 400° C. respectively; water inlet and outlet temperatures of 70° C. and 200° C. respectively; and flue gas temperatures, immediately above and below the economiser, of 350° C. and 100–112° C. respectively, the ammonia distributor was designed to operate at an average ammonia feed rate of 1000 litres (calculated at 15.5° C. and 760 mm. of mercury pressure) per hour and the size of the vent holes was set as follows:

13(a) ⅛ inch; 13(b) 3⁄16 inch; and 13(c) ¼ inch.

As stated hereinbefore, it is the object of the present invention to provide a novel method of reducing corrosion in furnaces and to provide an improved furnace for the combustion of sulphur-containing fuels. However, it will be appreciated that by operation in the manner described other advantages may follow, thus for example, air pollution by acidic components in or formed from flue gases may be diminished.

We claim:

1. A method for reducing corrosion in furnaces when using a sulphur-containing carbonaceous or hydrocarbon fuel which comprises continuously injecting ammonia into said furnace in an amount constituting from 0.5% wt. to 9.0% wt. based on the total weight of sulphur in elemental and combined form in the fuel fed to said furnace, said ammonia being injected into a part of the combustion zone of said furnace beyond the flame zone at which the temperature is above the dew-point of untreated combustion gases and below 500° C.

2. A method as specified in claim 1 in which the ammonia is injected in admixture with recycled combustion gases.

3. A method as specified in claim 1 and wherein the fuel is a residual fuel oil, derived from petroleum and containing less than 5% by weight of sulphur, in which the amount of ammonia injected into the furnace is between 0.03% and 0.1% by weight of fuel oil fed thereto.

References Cited by the Examiner

UNITED STATES PATENTS

| 2,136,166 | 11/38 | Darrah | 110—1 |
| 2,412,809 | 12/46 | Harlow | 110—1 |
| 2,417,929 | 3/47 | Hanson | 158—77 |

FOREIGN PATENTS

| 24,923 | 6/14 | Great Britain. |
| 496,692 | 12/38 | Great Britain. |
| 705,176 | 3/54 | Great Britain. |

JAMES W. WESTHAVER, *Primary Examiner.*

FREDERICK L. MATTESON, JR., FREDERICK KETTERER, PERCY L. PATRICK, *Examiners.*